May 28, 1968
J. V. YOST
3,385,768
VAPOR-COMPRESSION WATER DISTILLATION APPARATUS
Filed July 26, 1965
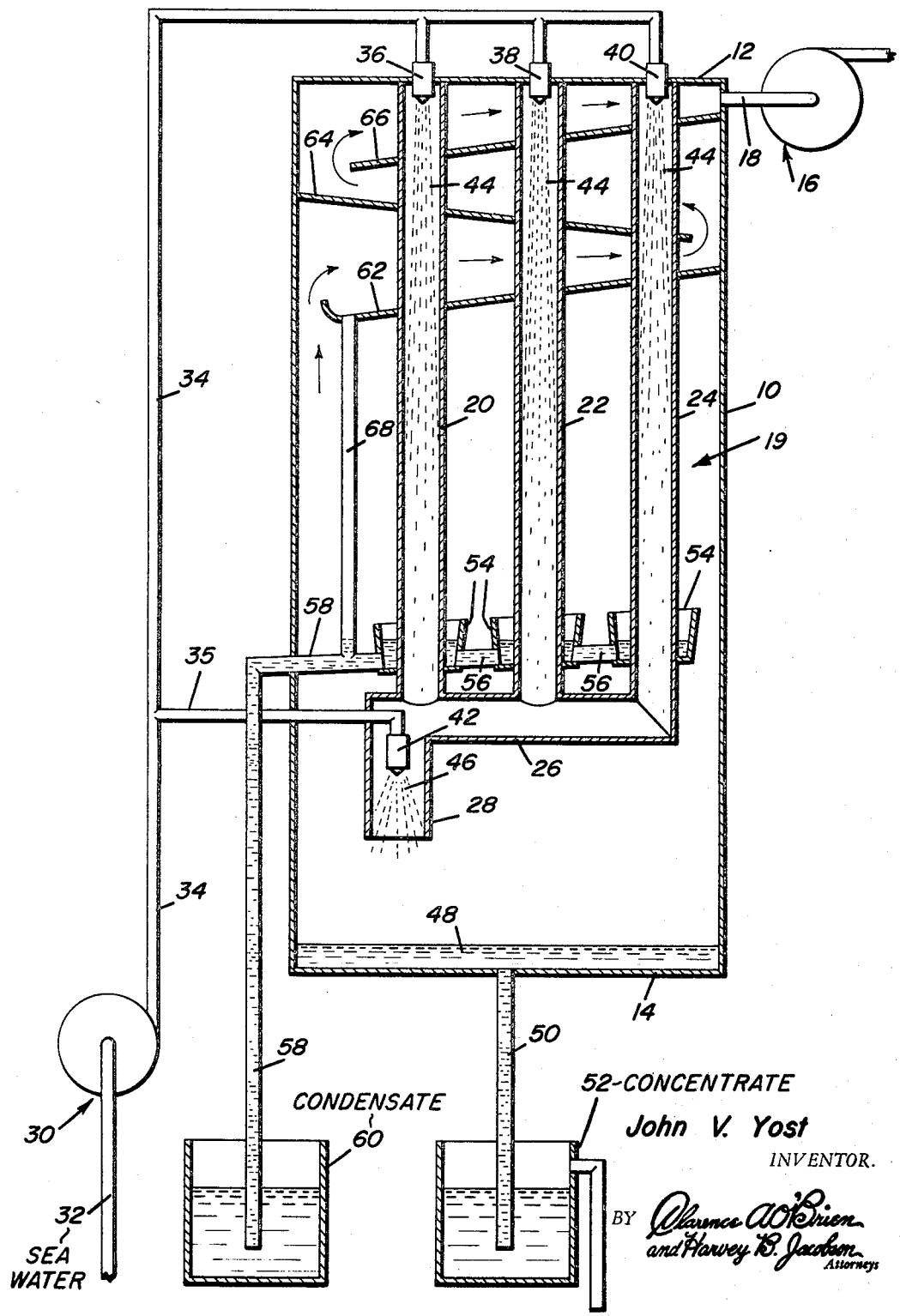
John V. Yost
INVENTOR.

3,385,768
VAPOR-COMPRESSION WATER DISTILLATION
APPARATUS
John V. Yost, 2233 Riverside,
Trenton, Mich. 48104
Filed July 26, 1965, Ser. No. 474,656
4 Claims. (Cl. 202—186)

ABSTRACT OF THE DISCLOSURE

A vapor compression apparatus for de-salinating water in a closed system including a vertically disposed evacuated tank having a plurality of vertically disposed tubes therein, the lower ends of which communicate with the interior of the tank. Each vertically disposed tube is provided at its upper end with a water jet pump for directing a high speed jet of water to be de-salinated downwardly into said tube whereby a reduction of pressure is effected in at least a portion of each of the tubes to flash off water vapor directed about the exterior of the vertical tubes to effect condensation thereof at generally increased pressures.

---

This invention relates generally to an apparatus for the distillation of a liquid and more particularly to an apparatus which may be advantageously utilized to de-salinate sea water by a vapor compression distillation technique.

The population explosion has brought about an ever increasing demand for fresh water for agricultural, industrial and domestic use. Unfortunately, many regions of this and other countries are without an adequate supply of fresh water.

A substantial amount of research is therefore being conducted in an attempt to develop an economical means of desalinating brackish or salt water on a commercial scale.

Various devices have been proposed heretofore to effect the desalination of salt water by a vapor compression distillation. Unfortunately, many of the devices proposed heretofore were unduly complex and generally required a mechanical pump means to effect compression and attendant condensation of the water vapor within the distillation apparatus.

It is therefore a primary object of this invention to provide a vapor compression distillation apparatus which does not require the utilization of a power operated pump means to effect compression of the vapor within the distillation apparatus.

It is another object of the invention to provide an improved vapor compression distillation apparatus which may be utilized to produce large volumes of fresh water from brackish or sea water without the necessity of utilizing an external heating means to enhance the vaporization of the water from the liquid being purified.

A further object of this invention is to provide a vapor compression distillation apparatus which includes a means adapted to establish a pressure differential between the region of the device where the liquid to be purified is being vaporized and the portion of the device wherein the condensation of the water vapor is carried out in order to compress the water vapor.

Still another object of this invention is to provide a vapor compression distillation apparatus wherein a means is provided for vaporizing a liquid to be purified at a reduced pressure and subsequently introducing the vapor into a second region at a relatively higher pressure, which pressure is still below the pressure surrounding the supply of liquid to be purified.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The drawings illustrate an exemplary embodiment of a vapor compression distillation apparatus constructed in accordance with the present invention.

Briefly, the present invention provides a vapor compression distillation apparatus which includes means for vaporizing or vacuum flashing a liquid such as salt water at subatmospheric pressure and then subjecting the water vapor produced to a differential pressure which is relatively higher than the vaporizing pressure but is still below atmospheric pressure which is of course presumably the ambient pressure of the salt water to be distilled. The establishment of such a pressure differential compresses the water vapor without the necessity of utilizing a power-operated mechanical pump means to compress, and consequently facilitate the condensation of, the water vapor evolved from the salt water being distilled.

Referring now specifically to the exemplary embodiment of the vapor compression distillation apparatus illustrated in the drawings it may be seen that there is provided a generally cylindrical vertically disposed tank 10 having a top wall 12 and a bottom wall 14. The interior of the tank 10 is maintained under a partial vacuum by a suitable power operated pump indicated generally at 16, the intake of which communicates with the interior of the tank 10 by means of a suitable conduit 18. As will become clear as the description proceeds the interior of the tank 10 is isolated from the atmosphere by suitable barometric standpipes 50, 58.

In the exemplary embodiment of the device illustrated a liquid vaporizing means indicated generally at 19 includes a plurality of vertically disposed tubes 20 and 22 and 24 which are sealingly secured at their upper ends to the top wall 12 of the tank 10 by suitable means such as welding for example. The open lower ends of the tubes 20, 22 and 24 are interconnected by an L-shaped manifold 26 having a base portion 28 disposed in a generally vertical downwardly opening position, which base portion 28 terminates in spaced apart relation to the bottom wall 14 of the tank 10.

A suitable pump indicated generally at 30 intakes a liquid to be distilled such as salt water through a suitable conduit 32. The power operated pump 30 discharges the salt water under super-atmospheric or relatively high pressure through conduit 34 and suitable high pressure high velocity spray nozzles 36, 38, 40 and 42 into the tubes 20, 22, 24 and manifold 26 comprising the liquid vaporizing means 19 of the device of the present invention. The nozzles 36, 38 and 40 are secured in suitable apertures in the top wall 12 of tank 10 with their respective discharge orifices disposed inwardly and downwardly of the interior of the respective tubes 20, 22 and 24. It will be understood that the point of entry of the respective nozzles 36, 38 and 40 through the top wall 12 of the tank 10 is sealed so as to preclude any leakage of air into the tank 10. The nozzle 42 positioned within the manifold 26 is connected to the pump discharge conduit 34 by means of a suitable conduit 35 which is sealingly received where it passes through the wall of the tank 10 and wall of the manifold 26 so as to preclude the leakage of fluid into the interior of tank 10 around the outer diameter of the pipe 35 or leakage of the fluid from the tank 10 into the manifold 26 at the point where the conduit 35 passes through the wall of the manifold 26.

The nozzles 36, 38, 40 and 42 are adapted to spray the salt water discharged from the pump 30 downwardly in their respective tubes at a high velocity thereby creating a partial vacuum within the evaporating means comprised of the tubes 20, 22 and 24 and their integral manifold 26, thereby causing the flash evaporation of a portion of the salt water spray 44 thus producing a substantial amount of water vapor. The establishment of a partial vacuum within the tubes 20, 22 and 24 is aided by the action of the salt water spray 46 discharging from the spray nozzle 42 within the manifold 26 thereby assuring that a substantial portion of the salt water flashes to produce a substantially saturated atmosphere within the interior of the compression and condensation tank 10 by virtue of the fact that the vapor produced in the tubes 20, 22 and 24 discharges into the interior of the tank 10 through the downwardly projecting open end 28 of the manifold 26. The unvaporized portion of the salt water spray 44 and 46 drops to the bottom of the tank 10 and collects such as indicated at 48. Inasmuch as the interior of the tank 10 must be maintained in a sealed relationship with regard to the atmosphere, as indicated supra, a barometric standpipe 50 is provided to maintain a column of sealing liquid of sufficient height to prevent the vacuum pump 16 from drawing air into the interior of the tank 10 through the standpipe 50 as concentrated salt water 48 is discharged from the interior of the tank 10 by means of the standpipe. The conduit 50 is preferably approximately 30 feet in length and terminates in spaced apart relation from the bottom of a suitable tank 52 the top of which tank is open to the atmosphere. Accordingly, concentrated salt water 48 may be discharged from the interior of the tank 10 without exposing the interior of the tank 10 to the atmosphere.

The vacuum pump 16 maintains the interior of the vapor compression and condensation tank 10 at a subatmospheric pressure which is relatively higher than the pressure within the tubes 20, 22 and 24 and manifold 26 of the evaporating means 19 therefore subjecting the vapor discharging from the depending portion 28 of the manifold 26 to a vapor compression step which greatly facilitates the condensation of the water vapor on the exterior of the tubes 20, 22 and 24 which are effectively cooled by the flash evaporation of the salt water spray 44 therein. Accordingly, the compressed vapor travelling upwardly toward the vacuum pump 16 contacts the relatively cool heat exchange exterior surfaces of the tubes 20, 22 and 24 thus condensing and running downwardly therealong where it is collected by a plurality of annular troughs 54 which are interconnected by suitable conduits such as indicated at 56. The desalted or fresh water collecting in the troughs 54 passes by means of a conduit 58 to a suitable collection receptacle 60 in a barometrically sealed manner analogous to the withdrawal of the concentrated salt water 48 from the interior of the tank 10 so as to provide a liquid seal to prevent communication of the interior of the tank 10 with the atmosphere.

In order to insure that substantially all of the vapor moving upwardly within the interior of the compressing and condensing tank 10 comes in contact with the relatively cool exterior heat exchange surfaces of the tubes 20, 22 and 24 a plurality of angularly disposed baffles 62, 64 and 66 are provided adjacent the upper portion of the interior of the tank 10 so as to provide a tortuous passage for the vapor moving toward the vacuum pump 16 thereby insuring that substantially all the water vapor produced by the evaporating means 19 will be drawn into contact with the relatively cool exterior surfaces of the tubes 20, 22 and 24 thereby condensing the vapor and leaving only a small amount of air, such as may have been entrained in the salt water, to be removed from the interior of the tank 10 by the vacuum pump 16. Although not shown, the baffles 62, 64 and 66 are sealingly secured to the interior surface of the wall of the tank 10 and the exterior surfaces of the tubes 20, 22 and 24 so that the condensate collecting on the baffles 62, 64 and 66 is ultimately collected at the lowermost portion of the baffle 62 from whence it is combined with the condensate collected in the troughs 54 by means of a suitable conduit 68 which communicates with the desalted water outlet conduit 58.

Accordingly, it may be seen that the establishment of a pressure differential by the means described above compresses the vapor discharging from the manifold 26 by subjecting it to the relatively higher pressure within the tank 10 thereby providing a vapor compression distillation apparatus of simplified construction which does not require the utilization of a power operated compressor to effect compression and attendant condensation of the vapor evolved from the liquid being purified.

It will be understood of course that a vapor compression distillation apparatus constructed in accordance with the principles of this invention may utilize a lesser or greater number of evaporative tubes such as the tubes 20, 22 and 24. The number of the tubes utilized will be primarily dependent upon the desired fresh water output of the distillation apparatus.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a vapor compression apparatus for distilling liquid in a closed vacuum system the combination comprising a generally vertically disposed tank, at least one vertically disposed tube within said tank, said tube having a first upper and a second lower end, means operatively associated with said upper end of said tube to direct a high speed jet of liquid downwardly into said tube, said means being adapted to effect a reduction of pressure in said tube whereby a portion of the liquid being sprayed will flash to produce a vapor, said lower end of said tube communicating with the interior of said tank in spaced apart relation to the bottom thereof so as to permit said vapor to pass into said tank, power operated means operatively associated with the tank to reduce the pressure in said tank below the ambient pressure of the liquid to be distilled but above the pressure within said tube thereby establishing a pressure differential between the tube and tank interiors to enhance the condensation of said vapor by compressing said vapor, condensate collection means within said tank secured to the exterior of said tube, said condensate collection means including means for withdrawing said condensate from said tank without subjecting the interior of the tank to the ambient pressure of the liquid being distilled, and means mounted adjacent the upper interior end of said tank to provide a tortuous path for the vapors discharging from the lower end of said tube to insure that substantially all the vapor under compression within the interior of the tank comes into heat exchange relationship with the exterior surface of said tube thereby facilitating condensation of said compressed vapor, said means providing said tortuous path for said vapor including condensate collecting means including means adapted to combine said condensate with the condensate collected by said condensate collection means secured to said tube.

2. In a vapor compression distillation apparatus for distilling a liquid in a closed vacuum system the combination comprising a generally vertically disposed tank, power operated pump means for evacuating the tank to provide a first region of internal pressure below the ambient pressure said lower pressure being that to which a liquid to be purified is subjected, a liquid vaporizing means comprising a generally vertically disposed vaporizer tube means mounted within said tank with the lower end of said tube means opening into said tank in spaced relation to the bottom of said tank, liquid jet pump means operatively and sealingly associated with the upper closed end of said tube means to direct a high speed jet of liquid to be purified downwardly into said tube means, said jet pump means providing a second region of internal pressure in at least a portion of said tube of lower magnitude than said pressure in said first region whereby a portion of the liquid being sprayed will flash to produce a vapor which passes into the tank from the lower end of said tube means to be condensed generally on the exterior of said tube means but prior to passage of the vapor to the pump means, and condensate collection means carried by the exterior of said tube means, said condensate collection means including means for withdrawing said condensate from said tank without subjecting the interior of the tank to the ambient pressure of the liquid being distilled.

3. In a vapor compression apparatus for distilling liquid in a closed vacuum system the combination comprising a generally vertically disposed tank, at least one vertically disposed tube within said tank, said tube having a closed upper and an open lower end, means operatively and sealingly associated with said upper end of said tube to direct a high speed jet of liquid downwardly into said tube, said means being adapted to effect a reduction of pressure in said tube whereby a portion of the liquid being sprayed will flash to produce a vapor, said lower end of said tube communicating with the interior of said tank in spaced apart relation to the bottom thereof so as to permit said vapor to pass into said tank, power operated means operatively associated with the tank to reduce the pressure in said tank below the ambient pressure of the liquid to be distilled but above the pressure within said tube thereby establishing a pressure differential between the tank and tube interiors to enhance the condensation of said vapor by compressing said vapor, condensate collection means within said tank secured to the exterior of said tube, said condensate collection means including means for withdrawing said condensate from said tank without subjecting the interior of the tank to the ambient pressure of the liquid being distilled, and a second means operably associated with said lower end of said tube to direct a high speed jet of liquid downwardly from said lower end of said tube into said tank to assist said means associated with said upper end of said tube in reducing pressure in said tube.

4. The combination of claim 2 including second liquid jet pump means operably associated with the lower end of said tube means and providing a second high speed jet of liquid to be purified directed downwardly from said lower end of said tube means into said tank to assist said liquid jet pump means associated with the upper end of said tube means in reducing pressure in said tube means.

References Cited
UNITED STATES PATENTS

| | | | |
|---|---|---|---|
| 1,401,578 | 12/1921 | Bleichen | 202—163 |
| 2,696,465 | 12/1954 | Kittredge | 203—10 |
| 3,190,817 | 6/1965 | Neugebauer et al. | 202—236 |
| 3,244,601 | 4/1966 | Diedrich | 202—236 |

NORMAN YUDKOFF, *Primary Examiner.*

J. SOFER, *Assistant Examiner.*